United States Patent
Tsuji

(10) Patent No.: US 6,820,492 B2
(45) Date of Patent: Nov. 23, 2004

(54) PRESSURE MEASURING APPARATUS

(75) Inventor: Tomoharu Tsuji, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/315,637

(22) Filed: Dec. 10, 2002

(65) Prior Publication Data

US 2003/0140706 A1 Jul. 31, 2003

(30) Foreign Application Priority Data

Dec. 26, 2001 (JP) ........................................ 2001-393842

(51) Int. Cl.$^7$ .............................................. G01L 9/00
(52) U.S. Cl. ........................................ 73/753; 73/714
(58) Field of Search ................................... 73/700–756

(56) References Cited

U.S. PATENT DOCUMENTS 5,681,997 A    10/1997    McHale et al. ................ 73/727
5,708,202 A  *   1/1998    Augustin et al. ......... 73/119 A

FOREIGN PATENT DOCUMENTS

EP    0341226    11/1989
EP    0590292    4/1994

* cited by examiner

*Primary Examiner*—Edward Lefkowitz
*Assistant Examiner*—Jermaine Jenkins
(74) *Attorney, Agent, or Firm*—Adams & Wilks

(57) ABSTRACT

To provide a portable pressure measuring apparatus with a pressure sensor of highly accurate output and small electric power consumption. A pressure measuring apparatus of the invention is provided with an impedance bridge circuit (pressure sensor part) for measuring pressure; a drive unit (sensor driving part) for applying voltage to the above impedance bridge circuit; a measuring unit (voltmeter) for sampling and measuring the electric potential difference between the middle points in both arms of the above impedance bridge circuit at a fixed time interval; and a determining unit (control part) for determining whether the difference between the pressure this time and the previous pressure sampled and measured by the above measuring unit reaches a predetermined threshold or below.

16 Claims, 5 Drawing Sheets

PRESSURE MEASURING APPARATUS

BACKGROUND OF THE INVENTION

The present invention relates to a pressure measuring apparatus, more specifically, to a pressure measuring apparatus using a semiconductor pressure sensor.

It is known that a conventional semiconductor pressure sensor produces an output current that varies This property will be described with the use of FIGS. 8 to 10. First, the configuration of a conventional pressure measuring apparatus will be described with reference to the schematic diagram shown in FIG. 8. In FIG. 8, the conventional pressure measuring apparatus 2 has a sensor driving part 21, a pressure sensor part 22, and a voltmeter 23.

The sensor driving part 21 applies voltage to both ends of the pressure sensor part 22 for driving the pressure sensor part 22. The pressure sensor part 22 is a Wheatstone bridge impedance bridge circuit configured of four impedances. The voltmeter 23 measures the electric potential difference between the middle points in both arms of the impedance bridge circuit and it outputs and displays the measured value as sensor output.

Operation of the traditional pressure measuring apparatus will be described with reference to FIGS. 9 and 10. FIG. 9 illustrates a drive waveform output by the sensor driving part 21 for driving the pressure sensor part 22 and also indicates measurement sampling timing at which voltage is measured in the voltmeter 23 of the conventional pressure measuring apparatus 2. As shown in FIG. 9, the drive waveform output by the sensor driving part 21 is a step waveform, and the electric potential difference between the middle points in both arms of the pressure sensor part 22 is measured at predetermined time intervals (timing).

FIG. 10 is a diagram illustrating the sensor output current-carrying property of the pressure sensor part 22 of the conventional pressure measuring apparatus 2. As shown in FIG. 10, the output of the pressure sensor part 22 has a transition period portion that is a fixed period from voltage application by the sensor driving part 21 and a steady period state period portion after the fixed period of the transition period portion. Thus, the semiconductor pressure sensor has a sensor output variation with a transit phenomena. On this account, various methods have been used traditionally to overcome this. Such methods include, for instance, measuring voltage a plurality of times from the beginning of measurement sampling, calculating the average value of each measured value, and using this as the measured value this time, or measuring the voltage at predetermined times or at predetermined times after a fixed period of time has passed and taking the average value as the measured value.

However, the traditional pressure measuring apparatus 2 has the transition period of pressure variation due to current carrying, and thus it can be considered that pressure is measured at a fixed point (time) from current carrying, but it has had a problem that the initial state is varied in the case of the midway returning from the steady state to the initial state after once pressure has been measured and thus accurate values cannot be measured.

In addition, in the conventional pressure measuring apparatus 2, time for the transition period of pressure variation due to current carrying shown in FIG. 10 sometimes takes several tens of seconds, which causes the problem that measurement is performed while sensor output is varying for a predetermined plurality of times for measurement sampling.

Furthermore, in order to solve these problems, when current is carried until the output variation in the pressure sensor part 22 becomes stable and then pressure is measured, consumption current carried through the pressure sensor part 22 becomes greater. In this manner, the amount of electric power consumption of the pressure measuring apparatus 2 is increased. Therefore, even though the housing is allowed to be smaller, there has been a problem that the portability of the traditional pressure measuring apparatus 2 is impaired in relation to electric power consumption.

The present invention has been made in view of the foregoing problems. An object of the invention is to provide a portable pressure measuring apparatus with a pressure sensor of highly accurate output and small electric power consumption.

SUMMARY OF THE INVENTION

In order to solve the foregoing problems, the pressure measuring apparatus of the invention comprises an impedance bridge circuit comprised of a plurality of impedance elements arranged in a bridge configuration for measuring pressure, a drive unit for applying voltage to the impedance bridge circuit, a measuring unit for sampling and measuring the electric potential difference between the middle points in both arms of the impedance bridge circuit at a fixed time intervals, and a determining unit for determining whether the difference between the current pressure and a previous pressure sampled and measured by the measuring unit reaches a predetermined threshold or below.

According to the present invention, pressure is sampled and measured by the measuring unit at predetermined timing, the difference between the successively measured values is determined by the determining unit to determine whether the difference has reached the predetermined threshold or below, and the measured value that has reached the threshold or below is displayed, output, and the like, as a sensor output. Accordingly, the output accuracy of the pressure sensor in the pressure measuring apparatus can be enhanced because of a reduced influence of the transition phenomena due to the output variation in the pressure sensor.

In addition, it is unnecessary to perform measurement sampling for a considerable number of times in order to increase the output accuracy of the pressure sensor as previously done, and thus, the electric power consumption of the pressure measuring apparatus can be suppressed. As a result, the apparatus does not need electric power supply from an external power source and it is portable.

Furthermore, as the pressure sensor applied to the invention, a semiconductor pressure sensor, in which four polysilicon piezoresistors are used to form a Wheatstone bridge, and the like can be considered, but it is not limited to these. Any pressure sensor having a property of output variation is acceptable.

Moreover, in the present invention, it is acceptable that a drive voltage waveform applied by the above drive unit is either a step waveform or pulse waveform. The unique advantage of the invention is also apparent when the drive voltage is a step voltage. However, in the case where the drive voltage is a pulse voltage, the output of the pressure sensor can returned to a steady state quicker than in the case of a step voltage. More specifically, time for transition phenomena can be shortened and electric power can be reduced in the pulse waveform more than in the step waveform, and thus the number of times for measurement sampling can be decreased and the consumption current (electric power consumption) of the pressure sensor can be further reduced.

Besides, in order to solve the foregoing problems, the pressure measuring apparatus of the invention comprises an impedance bridge circuit for measuring pressure, a drive unit for applying voltage in a pulse drive waveform to the impedance bridge circuit, and a measuring unit for sampling and measuring the electric potential difference between the middle points in both arms of the impedance bridge circuit at a fixed time intervals.

According to the invention, the drive unit applies the voltage in the pulse drive waveform to the pressure sensor formed of the impedance bridge circuit, whereby the output of the pressure sensor can be turned to the steady state soon. Thus, the number of times for measurement sampling can be decreased, whereby the consumption current of the pressure sensor can be reduced, that is, the electric power consumption of the pressure measuring apparatus can be reduced.

DETAILED DESCRIPTION OF THE PREFERRED

Hereafter, preferred embodiments of a pressure measuring apparatus 1 in the accordance with the present invention will be described in detail with reference to FIGS. 1 to 6. The preferred embodiments are illustrative only, and the invention is not intended to be limitedly to them.

Figure 1:
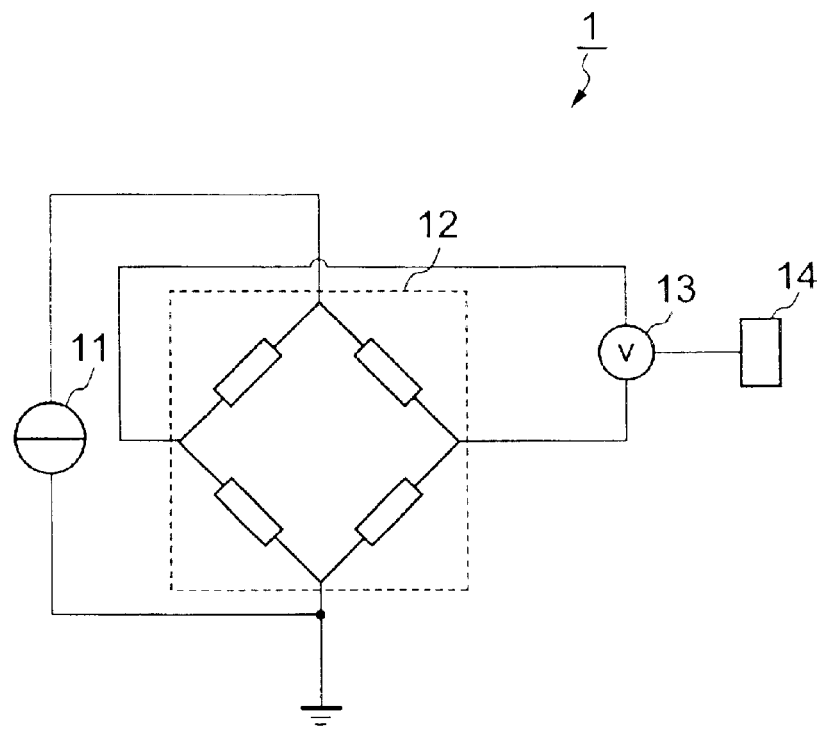
FIG. 1 is a schematic diagram of the pressure measuring apparatus 1 of the invention.

First, the configuration of the invention will be described. FIG. 1 is a schematic diagram of a pressure measuring apparatus 1 in a first embodiment of the present invention. In FIG. 1, the pressure measuring apparatus 1 is configured of a sensor driving part 11, a pressure sensor part 12, a voltmeter 13, and a control part 14. In addition, each of the components other than the control part 14 is the same as each of the components of the traditional pressure measuring apparatus 2, and thus a detailed description of them is omitted.

The control part 14 stores fixed threshold data set beforehand, calculates the difference between a current measured value and a previously measured value, i.e. an output variation for every measurement sampling of the pressure sensor part 12, and determines whether the calculated difference value reaches the threshold or below. Then, when the control part 14 determines that the output variation reaches the threshold or below, the control part 14 allows a display part, not shown, to display the value as the output of the pressure measuring apparatus 1. Furthermore, the control part 14 controls the ON/OFF state of the power source of the sensor driving part 11.

In addition, the pressure measuring apparatus 1 includes an input part (not shown) for instructing start of pressure measurement or for changing setting modes by a user as the component other than those described above. The input part is a button and the like disposed on the side surface of the housing of the pressure measuring apparatus 1. The display part is a liquid crystal display (LCD) and the like installed on the housing of the pressure measuring apparatus 1.

Figure 2:
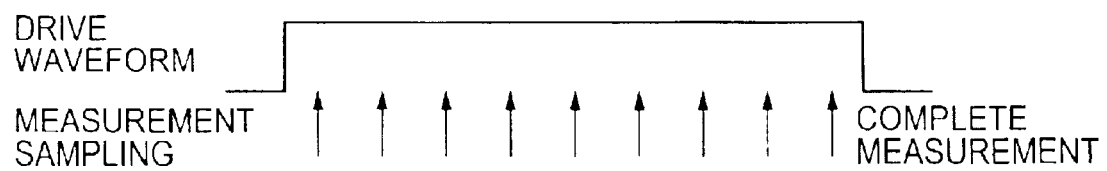
FIG. 2 is a diagram illustrating the drive waveform outputted by the sensor driving part 11 for driving the pressure sensor part 12 and measurement sampling for measuring voltage in the voltmeter 13 in the pressure measuring apparatus 1 in the embodiment 1 of the invention.
Figure 3:
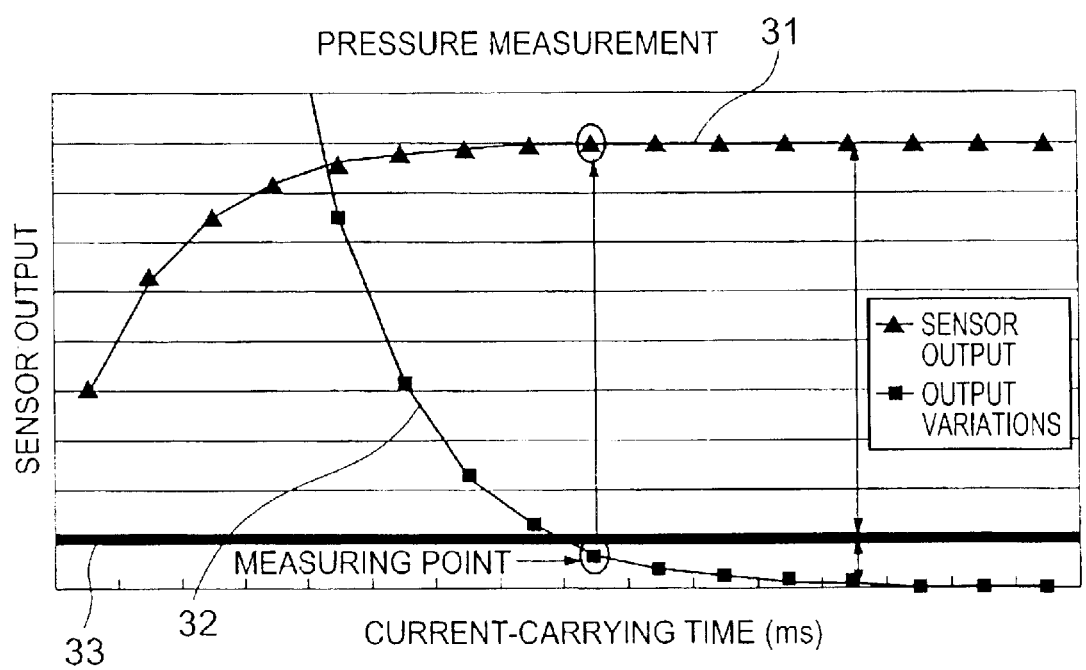
FIG. 3 is a diagram illustrating the sensor output current-carrying property of the pressure sensor part 12 in the pressure measuring apparatus 1 in the embodiment 1 of the invention.

Next, the operations of the invention will be described. FIGS. 2 to 7 are diagrams for illustrating the operations of the pressure measuring apparatus 1 in the invention. With the use of FIGS. 2 and 3, an embodiment 1 of the invention will be described. FIG. 2 is a diagram illustrating a drive waveform outputted by the sensor driving part 11 for driving the pressure sensor part 12 and measurement sampling for measuring voltage in the voltmeter 13 in the pressure measuring apparatus 1 in the embodiment 1 of the invention. As apparent from FIG. 2, the drive waveform and measurement sampling are the same as those adapted before. In addition, FIG. 3 is a diagram illustrating the sensor output current-carrying property of the pressure sensor part 12 in the pressure measuring apparatus 1 in the embodiment 1 of the invention.

As shown in FIG. 2, the voltage applied to the pressure sensor part 12 by the sensor driving part 11 is voltage in the step waveform as before, and measurement sampling is performed at fixed time intervals as well. The point where the invention is different from the prior art is in that the control part 14 monitors output variations in the values of sensor output measured for every measurement sampling (the difference where the previously measured value is subtracted from the measured value this time). FIG. 3 depicts two curves for a sensor output 31 in the pressure sensor part 12 and for an output variation 32 thereto. As shown in FIG. 3, the output variation 32 is particularly large in the transition period of the property of output variation due to current carrying, and it is converged to nearly zero over time, i.e. to the steady state.

In addition, a thick line 33 depicted in the under side of the graph is the threshold of the output variation 32 set beforehand in the control part 14. It is acceptable that this threshold is set beforehand in accordance with the sensor output of the pressure sensor part 12, or it is set by a user in accordance with the user's usage type (for example, the threshold is set to a large value when power saving is desired because of a great frequency of use, or it is set to a smaller value when the accuracy of the measured value is further enhanced); of course, it may be set to zero.

When the output variation 32 in the pressure sensor part 12 reaches the threshold or below, that is, the output variation 32 is below the thick line 33 in FIG. 3 (in the drawing, it is depicted as a measuring point), the control part 14 displays the sensor output this time of the pressure sensor part 12 as the measured value in the display part, not shown. Then, when the control part 14 determines the measured value of pressure, it turns the power source of the sensor driving part 11 off.

As described above, the pressure measuring apparatus 1 in the embodiment 1 of the invention has been provided with: the pressure sensor part (impedance bridge circuit) 12 for measuring pressure; the sensor driving part 11 for applying voltage to the above pressure sensor part 12; the voltmeter 13 for sampling and measuring the electric potential difference between the middle points in both arms of the above impedance bridge circuit at a fixed time interval; and the control part 14 for determining whether the difference between the pressure this tine and the previous pressure sampled and measured by the above voltmeter 13 reaches a predetermined threshold or below. Therefore, the pressure measuring apparatus 1 of the invention is less influenced by the transition phenomena in the property of output variation in the pressure sensor, and thus the output accuracy of the pressure sensor can be enhanced in the pressure measuring apparatus.

In addition, it is unnecessary to perform measurement sampling considerable times in order to increase the output accuracy of the pressure sensor as the traditional pressure measuring apparatus 2 has done (unnecessary measurements do not need to be done). Therefore, the electric power consumption of the pressure measuring apparatus 1 can be suppressed small. Accordingly, the apparatus does not need electric supply from an external power supply and users can carry the pressure measuring apparatus 1 of the invention.

Figure 4:
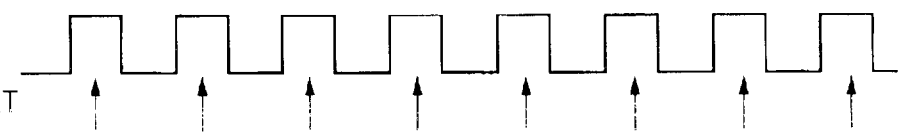
FIG. 4 is a diagram illustrating the drive waveform (pulse waveform) outputted by the sensor driving part 11 for driving the pressure sensor part 12 and measurement sampling for measuring voltage in the voltmeter 13 in the pressure measuring apparatus 1 in the embodiment 2 of the invention.

Next, with the use of FIGS. 4 and 5, an embodiment 2 of the invention will be described. FIG. 4 is a diagram illustrating a drive waveform (pulse waveform) outputted by a sensor driving part 11 for driving a pressure sensor part 12 and measurement sampling for measuring voltage in a voltmeter 13 in a pressure measuring apparatus 1 in the embodiment 2 of the invention. As shown in FIG. 4, the drive waveform is a pulse waveform different from the case of the step waveform in the first embodiment. In addition, it is acceptable that the configuration of the pressure measuring apparatus 1 in the embodiment is exactly the same as the pressure measuring apparatus 1 in the first embodiment, or that of omitting the control part 14.

Figure 5:
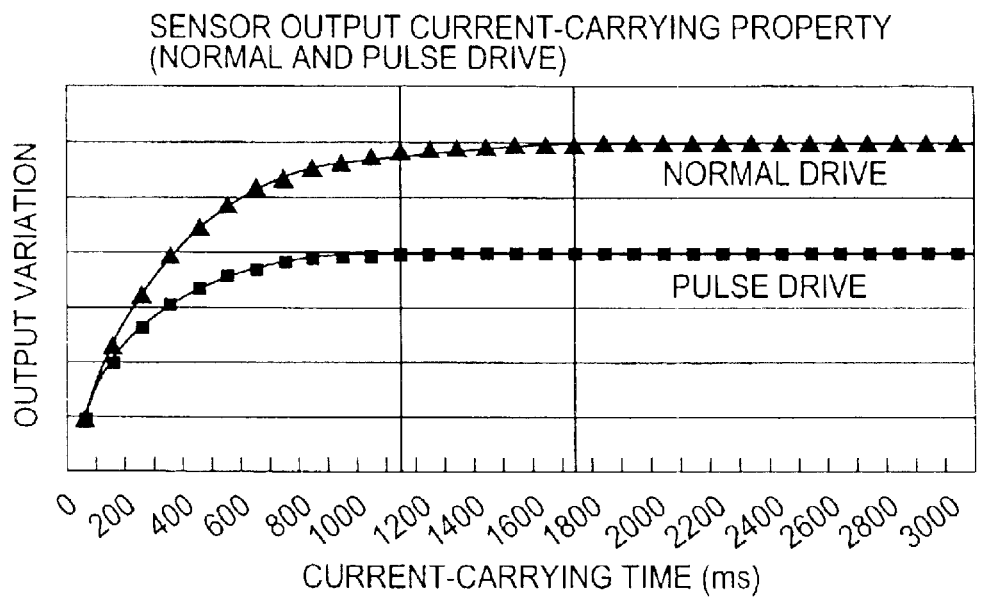
FIG. 5 is a diagram illustrating the sensor output current-carrying property of the pressure sensor part 12 in the pressure measuring apparatus 1 in the embodiment 2 of the invention.

FIG. 5 is a diagram illustrating the sensor output current-carrying property of the pressure sensor 12 in the pressure measuring apparatus 1 in the embodiment 2 of the invention. In FIG. 5, the property of output variation in the pressure sensor part 12 in normal drive (that is, step voltage is applied) is depicted as similar to the property of output variation in the pressure sensor part 12 in pulse drive for comparison. In this manner, pulse drive is set, whereby the apparatus reaches the steady period faster than the case of the step drive (about 600 ms in this drawing). This is because it has been utilized that the output variations in the pressure sensor part 12 are changed greatly (steeply) at the instant of applying voltage.

As described above, in the pressure measuring apparatus 1 in the embodiment 2 of the invention different from the step drive waveform in the embodiment, the drive waveform applied to the pressure sensor part 12 was set to the pulse drive waveform. Thus, time for reaching the steady period in the sensor output current-carrying property can be shortened, and the number of times for measurement sampling can be reduced.

In addition, electric power for driving the pressure sensor part 12 can be reduced in the pulse waveform more than in the step waveform. Therefore, the consumption current (electric power consumption) of the pressure sensor can be further reduced.

Figure 6:
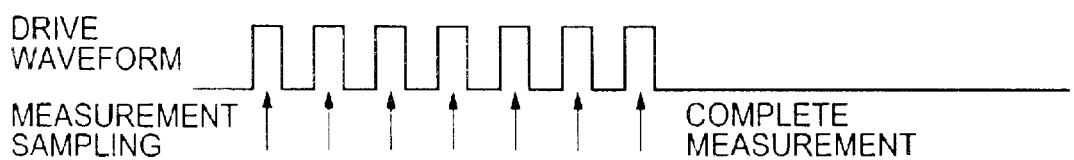
FIG. 6 is a diagram illustrating the drive waveform (pulse waveform) outputted by the sensor driving part 11 for driving the pressure sensor part 12 and measurement sampling for measuring voltage in the voltmeter 13 in the pressure measuring apparatus 1 in the embodiment 3 of the invention.

Next, with the use of FIGS. 6 and 7, an embodiment 3 of the invention will be described. FIG. 6 is a diagram illustrating a drive waveform outputted by a sensor driving part 11 for driving a pressure sensor part 12 and measurement sampling for measuring voltage in a voltmeter 13 in a pressure measuring apparatus 1 in the embodiment 3 of the invention. In the embodiment 3, the first and second embodiments were combined and adapted. Accordingly, the drive waveform and measurement sampling shown in FIG. 6 are the same as those illustrated in FIG. 4 in the second embodiment. Furthermore, the configuration of the pressure measuring apparatus 1 in the embodiment is exactly the same as the configuration in the first embodiment.

Figure 7:
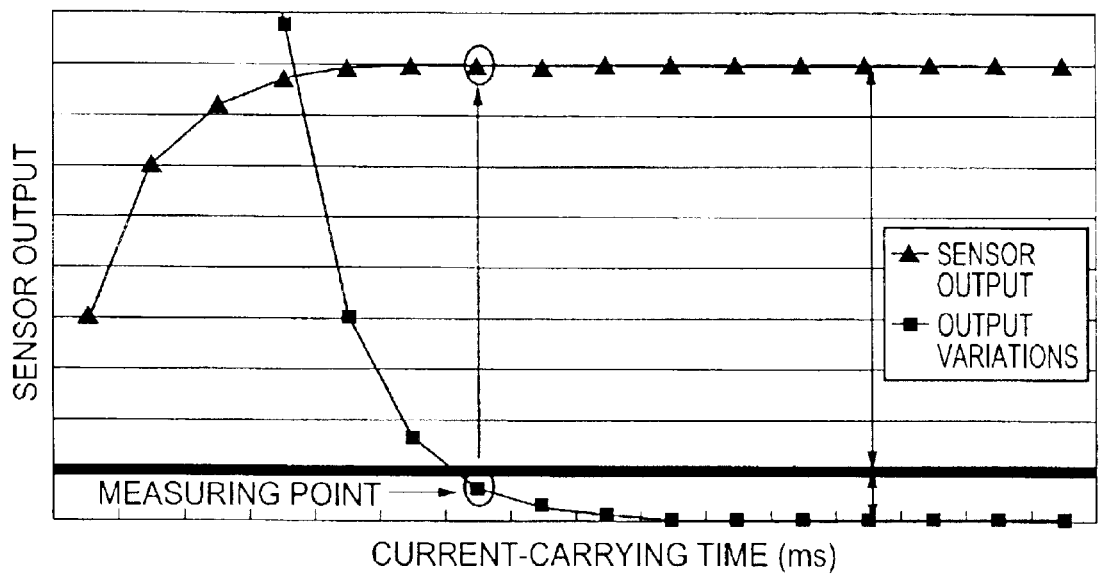
FIG. 7 is a diagram illustrating the sensor output current-carrying property of the pressure sensor part 12 in the pressure measuring apparatus 1 in the embodiment 3 of the invention.
Figure 8:
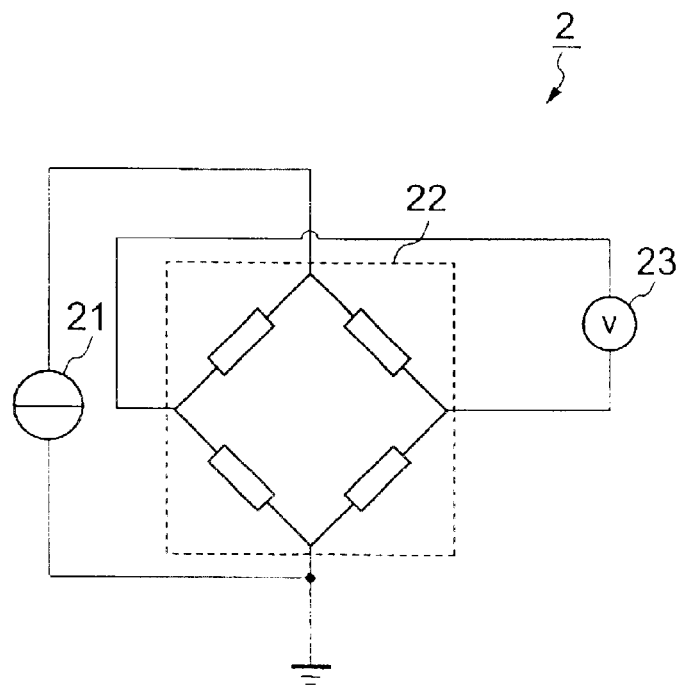
FIG. 8 is a schematic circuitry diagram of the traditional pressure measuring apparatus 2.
Figure 9:
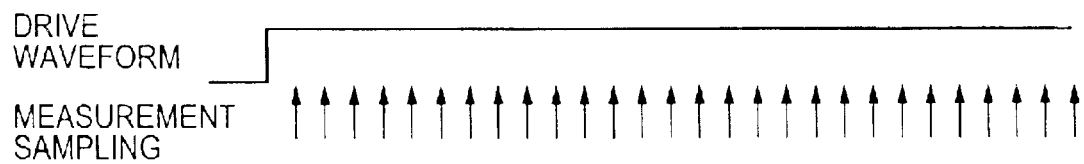
FIG. 9 is a diagram illustrating the drive waveform outputted by the sensor driving part 21 for driving the pressure sensor part 22 and measurement sampling for measuring voltage in the voltmeter 23 in the traditional pressure measuring apparatus 2.
Figure 10:
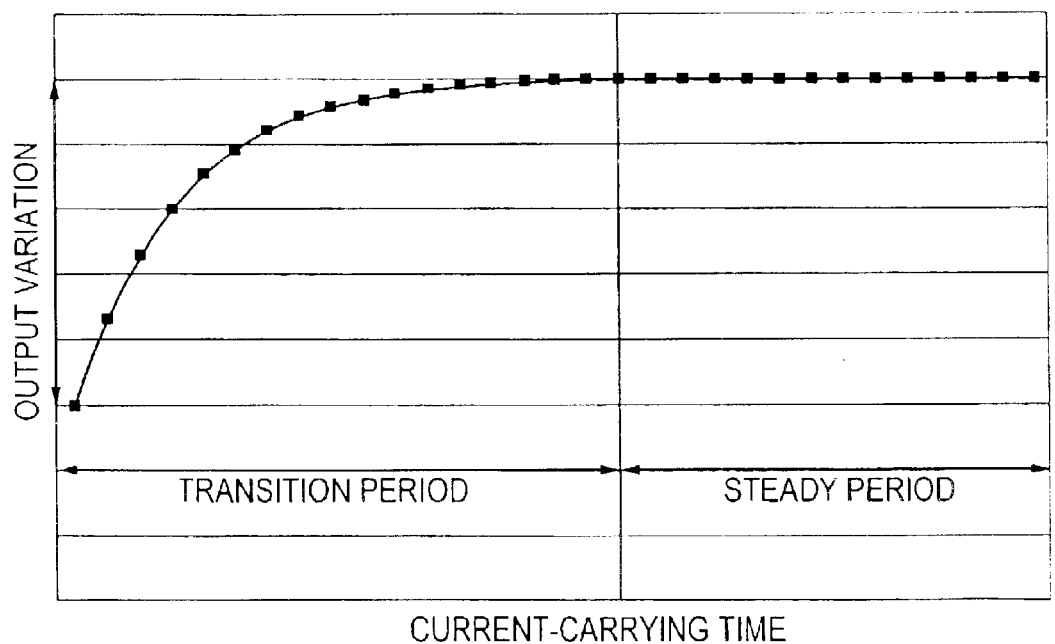
FIG. 10 is a diagram illustrating the sensor output current-carrying property of the pressure sensor part 22 in the traditional pressure measuring apparatus 2.

FIG. 7 is a diagram illustrating the sensor output current-carrying property of the pressure sensor 12 in the pressure measuring apparatus 1 in the embodiment 3 of the invention. The description of the sensor output and output variations in the pressure sensor part 12 and the like are the same as those in the first embodiment (FIG. 3), thus omitting them here. As apparent from the comparison of FIG. 3 with FIG. 7, in this embodiment, the output of the pressure sensor part 12 reaches the steady state sooner than the case where the drive voltage waveform is the step waveform in the first embodiment.

As described above, the pressure measuring apparatus 1 in the embodiment 3 of the invention has been configured by combining the configurations and the operations of the pressure measuring apparatus 1 in the first and second embodiments, and thus the advantageous effect of the pressure measuring apparatus 1 in the first and second embodiments can be exerted synergistically.

According to the invention, the apparatus is less influenced by the transition phenomena in the property of output variation in the pressure sensor, and thus the output accuracy of the pressure sensor can be enhanced in the pressure measuring apparatus. In addition, the electric power consumption of the pressure measuring apparatus can be suppressed small. Therefore, the apparatus does not need power supply from the external power source, and it is portable.

What is claimed is:

1. A pressure measuring apparatus comprising: an impedance bridge circuit comprised of a plurality of impedance elements arranged in a bridge configuration for measuring a pressure; a drive unit for applying a driving waveform to the impedance bridge circuit; a measuring unit for successively measuring a potential value in the impedance bridge circuit and outputting a measurement value; a determining unit for determining whether a difference between a currently measured value and an immediately preceding measured value is at or below a predetermined threshold; and a control unit for controlling the measuring unit to output the measured value only when the difference between the currently measured value and the immediately preceding measured value is at or below the predetermined threshold.

2. A pressure measuring apparatus according to claim 1; wherein the impedance bridge circuit is a Wheatstone bridge comprised of polysilicon piezoresistors.

3. A pressure measuring apparatus according to claim 1; wherein the driving waveform applied by the drive unit is a step waveform.

4. A pressure measuring apparatus according to claim 1; wherein the driving waveform applied by the drive unit is a pulse waveform.

5. A pressure measuring apparatus according to claim 1; wherein the impedance bridge circuit is a Wheatstone bridge comprised of a parallel connection of two arms each comprising series-connected polysilicon piezoresistors.

6. A pressure measuring apparatus according to claim 5; wherein the measuring unit measures a potential difference between midpoints of the two arms of the impedance bridge circuit.

7. A pressure measuring apparatus comprising: an impedance bridge circuit comprised of a plurality of impedance elements arranged in a bridge configuration for measuring a pressure; a drive unit for successively applying voltage pulses to the impedance bridge circuit; and a measuring unit for successively measuring a potential difference across the impedance bridge circuit during application of the voltage pulses and outputting a measured value.

8. A pressure measuring apparatus according to claim 7; wherein the impedance bridge circuit is a Wheatstone bridge comprised of a parallel connection of two arms each comprising series-connected polysilicon piezoresistors.

9. A pressure measuring apparatus according to claim 8; wherein the measuring unit measures a potential difference between midpoints of the arms of the impedance bridge circuit.

10. A pressure measuring apparatus comprising: a pressure sensor; a driving circuit for driving the pressure sensor; a measuring unit for successively measuring an output of the pressure sensor and outputting a measured value; a determining unit for determining whether a difference between a currently measured output value and an immediately preceding measured output value is at or below a predetermined threshold; and a control unit for controlling the measuring unit to output the measured value only when the difference between the currently measured output value and the immediately preceding measured output value is at or below the predetermined threshold.

11. A pressure measuring apparatus according to claim 10; wherein the pressure sensor comprises an impedance bridge circuit.

12. A pressure measuring apparatus according to claim 11; wherein the impedance bridge circuit is a Wheatstone bridge comprised of polysilicon piezoresistors.

13. A pressure measuring apparatus according to claim 11; wherein the impedance bridge circuit is a Wheatstone bridge comprised of a parallel connection of two arms each comprising series-connected polysilicon piezoresistors.

14. A pressure measuring apparatus according to claim 13; wherein the measuring unit measures a potential difference between midpoints of the arms of the impedance bridge circuit.

15. A pressure measuring apparatus according to claim 10; wherein a drive voltage waveform applied by the drive unit is a step waveform.

16. A pressure measuring apparatus according to claim 10; wherein a drive voltage waveform applied by the drive unit is a pulse waveform.

* * * * *